United States Patent [19]

Dallmer

[11] Patent Number: 4,744,422
[45] Date of Patent: May 17, 1988

[54] HORSE HOOF SHOE WHICH IS MOUNTABLE WITH BELTS

[76] Inventor: Helmuth Dallmer, Alte Landstrasse 3, 2125 Salzhausen-Putensen, Fed. Rep. of Germany

[21] Appl. No.: 910,212
[22] PCT Filed: Dec. 5, 1985
[86] PCT No.: PCT/EP85/00674
 § 371 Date: Aug. 27, 1986
 § 102(e) Date: Aug. 27, 1986
[87] PCT Pub. No.: WO86/03936
 PCT Pub. Date: Jul. 17, 1986

[30] Foreign Application Priority Data

Dec. 29, 1984 [DE] Fed. Rep. of Germany ... 8438230[U]

[51] Int. Cl.⁴ ................................................. A01L 3/00
[52] U.S. Cl. .......................................... 168/18; 54/82
[58] Field of Search ..................... 168/1, 18, 22; 54/82

[56] References Cited

U.S. PATENT DOCUMENTS

| | | | |
|---|---|---|---|
| 115,311 | 5/1871 | Halsey | 168/18 |
| 830,403 | 9/1906 | Barclay | 168/22 X |
| 840,892 | 1/1907 | Adam | 168/1 |
| 1,035,537 | 8/1912 | Cook | 168/18 |
| 1,174,848 | 3/1916 | Gear | 168/18 |
| 1,357,399 | 11/1920 | Horn | 168/22 |

FOREIGN PATENT DOCUMENTS 3223187 12/1983 Fed. Rep. of Germany.

Primary Examiner—Robert P. Swiatek
Attorney, Agent, or Firm—Michael J. Striker

[57] ABSTRACT

A horse hoof shoe comprises a front part having a horse shoe like bottom portion and a wall portion upwardly extending from the bottom portion, a rear part formed as a cap and having a rear portion and at least one strip portion extending forwardly from the rear portion and engaging the wall portion, two upper loops and two lower loops provided on the rear portion of the rear part, two belts extending through the upper loops and the lower loops in a crosswise manner and also partially extending over the front part and each having one end arrested on the wall portion of the front part and another end located above the one end, and a tensioning device arranged at a front side and at the center of the wall portion of the front part and connected with the other ends of the belts, the tensioning device being selflocking and having a rotary bottom formed so that by rotation of the rotary bottom the belts are pulled forwardly or pushed rearwardly in a stepless manner without use of an additional tool.

10 Claims, 2 Drawing Sheets

HORSE HOOF SHOE WHICH IS MOUNTABLE WITH BELTS

BACKGROUND OF THE INVENTION

The invention relates to a horse hoof shoe which is mountable with belts and consists of a hoof shaped bottom part with walls, a cap and two straps. The cap continues on each side in the form of a strip engaging the wall of the bottom part. Loops are tipstretched on the rear side of the cap for receiving the belts.

A hoof shoe of this type can be strapped to the hoof of the horse and can be adjusted, so that there is no need to nail it or bond it to the hoof.

A hoof shoe of the aforementioned type is known from (DE-OS No. 32 23 187), wherein at each side of the cap on the upper side thereof a strip is tipstretched engaging the wall. At the rear wall of the cap, on the lower side thereof, loops are formed from receiving two buckle straps which are disposed in the form of a cross. Apertures are provided in the lower and upper area in the wall of the hoof shoe. Detailed particulars concerning the guiding of the buckle straps can be taken from the mentioned state of the art.

SUMMARY OF THE INVENTION

The object of the present invention consists in a further development of the mentioned state of the art with respect to a sufficient solid support on the hoof.

This object of the invention is solved in accordance with a hoof shoe which horse hoof shoe comprises a front part having a horse shoe-like bottom portion and a wall portion upwardly extending from the bottom portion, a rear part formed as a cap and having a rear portion and a least one strip portion extending forwardly from the rear portion and engaging the wall portion, two upper loops and two lower loops provided on the rear portion of the rear part, two belts extending through the upper loops and the lower loops in a crosswise manner and also partially extending over the front part and each having one end arrested on the wall portion of the front part and another end located above the one end, and a tensioning device arranged at a front side and at a center of the wall portion of the front part and connected with the other ends of the belts, the tensioning device being self-locking and having a rotary button formed so that by rotation of the rotary button the belts are pulled forwardly or pushed rearwardly in a stepless manner without use of an additional tool. The subclaims contain alternative measures, which are particularly efficient with respect to the mentioned object.

In a hoof shoe in accordance with the invention, a particularly good support is obtained on the hoof, in particular due to the straps, which make it possible by turning the rotary button to obtain a gradual given high tension of the belts. In view of the fact that the tensioning device itself is self-locking, the tension of the belts is maintained. Only by a desired turning of the rotary button in the counter direction can the tension be released, that is, only if the hoof shoe is to be removed. The tension in the belts results in a uniform pressure on the rear wall of the cap due to the cross wise arrangement. In accordance with a preferred embodiment of the invention the connection between cap and front part is made on each side by two strips which are tip-stretched on the cap, an upper strip and a lower strip, which both engage on the wall, whereby the belts support on the strips and exert a contact pressure thereon when they are subjected to a tension. The lower strip is displaceably received by a loop which is tip-stretched on the wall. The upper strip supports freely on the wall, but has itself a loop through which the belt is guided. Thereby a connection remains between the cap and the front part of the hoof shoe even during the releasing of the belts, because at each side the lower strip is received by a loop of the wall. The cap may be adjusted more to the rear or more to the front by displacement. The maximum of the rear displacement is fixed by an abutment on the lower strip.

The connection between the lower belt and the wall is performed by a screw which can be released. Holes are provided for the screw either on the belt or in the wall, or in both parts. Therefore, one can fix the connecting location eiher more to the front or more to the rear, depending how the cap is adjusted.

In accordance with a further embodiment of the invention the rear ends of the bottom part are connected with each other by a screwed-on metal or synthetic belt. By selecting a longer or shorter belt, the width of the hoof shoe can be adjusted, for the purpose of adapting it to the width of the horse hoof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
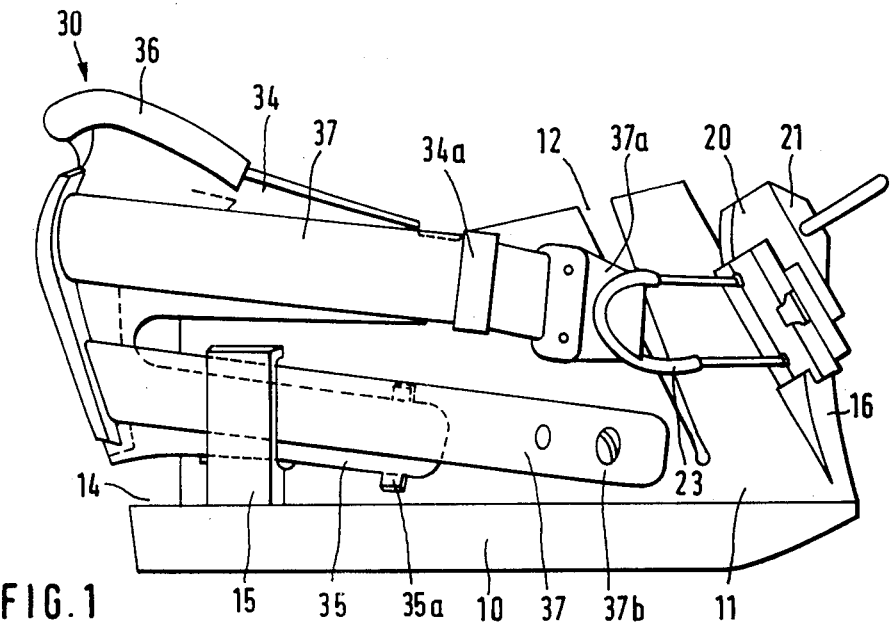
FIG. 1 illustrates a side view of the hoof shoe in accordance of the invention.
Figure 2:
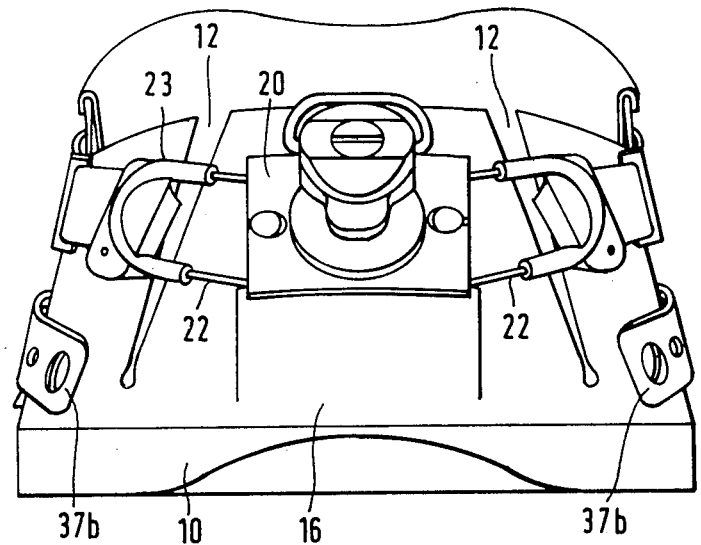
FIG. 2 a front view of the hoof shoe in accordance with the invention.
Figure 3:
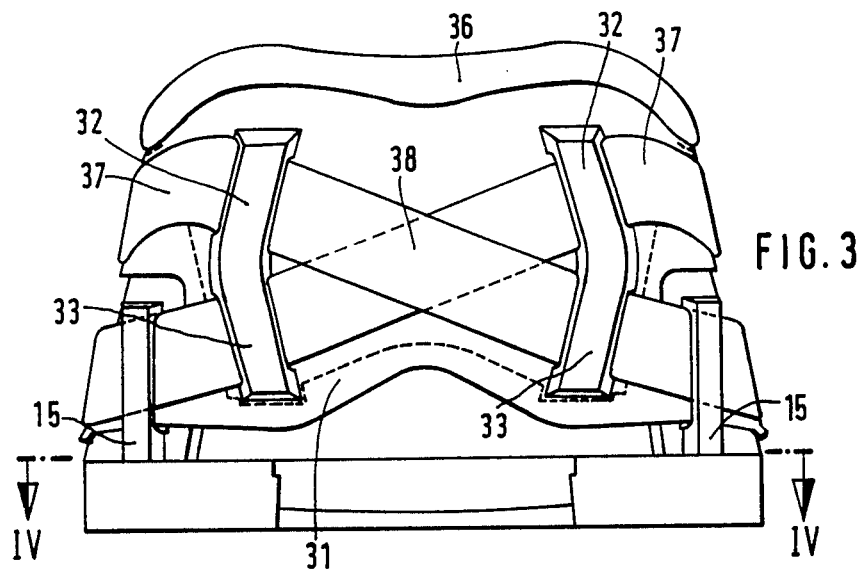
FIG. 3 a rear view of the hoof shoe in accordance with the invention.
Figure 4:
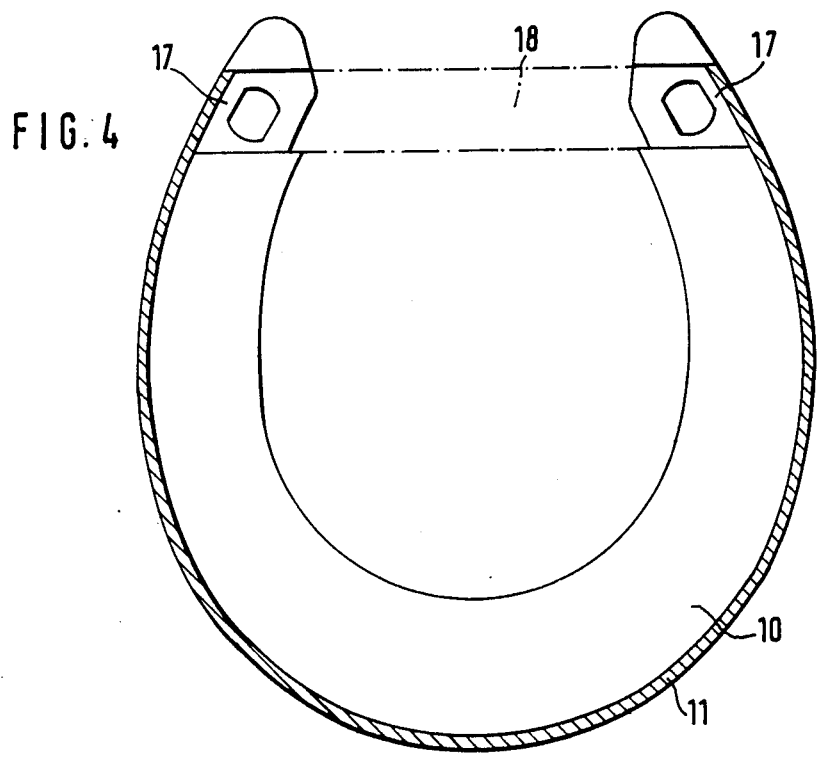
FIG. 4 is a section in accordance with line IV—IV of FIG. 3.

The hoof shoe consists of a front part and a cap, which both are molded plastic parts. With the assistance of two belts, these two parts are strapped to the horse hoof.

The front part has a horseshoe like bottom part 10, which upwardly extends into a wall 11 and adapts to the horse hoof. Slots 12 are provided forwardly in the wall 11 and open at the top, so as to improve the adaptability of the wall to the horse hoof. A tensioning device 20 with a rotary button 21 is mounted at front on a console 16. By rotating the rotary button two loops 22, which protrude on each side of the tensioning device, may be pulled either forwardly or rearwardly. The loops are moveably received by tubular bends 23.

Steps 14 are formed at the two ends of the bottom part 10 at the location where wall 11 is arranged. A cap 30 can rest on these steps. The two ends of the bottom part may be connected with each other by a metal strip 18. Recesses 17 are provided on the bottom part for receiving the metal strip. Each recess has one hole for a screw.

The cap 30 has a rear wall 31 with a cushion 36. Two laterally superimposed loops 32 and 33 are mounted on the rear wall for receiving the strips for tensioning purposes. An upper strip 34 and a lower strip 35 are mounted on each side of the rear wall 31. The lower strip is fed through a loop 15 in the side wall. The strip 35 is also displaceable in loop 15. Its end position is determined by an abutment 35a.

The upper srip 34 of the cap is freely supported on the upper part of wall 11.

Two belts 37 are provided for the tensioning of the hoof shoe on the horse hoof. The belts are disposed crosswise in an area 38 of the rear wall 31 of the cap and received by the upper or lower loops 32 and 33. At each side, the corresponding belt is fed to the forward end by the upper loop 32 and supported on the upper strip 34. There, the belt is fed through a loop 34a of the upper strip. At the upper end of each belt a hook 37a is provided, which is hooked into the tubular bend 23 of loop 22. The lower belt end 37b is arrested on the lower side of the wall by means of a screw. A plurality of holes are provided in the belt or in the wall for receiving the screw, so that the arresting point can be fixed more to the front or more to the rear.

When mounting the horse hoof shoe the belts are released from the loop, so that the possibility is provided to push the cap to the rear so that the hoof shoe can be placed over the horse hoof. Then the cap is moved forwardly, the belt ends are hooked in and the belts are being tensioned by rotating the rotary button 21 as would be required for a solid mounting. The tensioning device is selflocking, that is, the loops remain in their tensioned position as long as the rotary button is not rotated back.

It will be understood that each of the elements described above, or two or more together, may also find a useful application in other types of constructions differing from the types described above.

While the invention has been illustrated and described as embodied in a horse shoe mountable with belts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A horse hoof shoe, comprising a front part having a horse shoe like bottom portion and a wall portion upwardly extending from said bottom portion; a rear part formed as a cap and having a rear portion and at least one strip portion extending forwardly from said rear portion and engaging said wall portion; two upper loops and two lower loops provided on said rear portion of said rear part; two belts extending through said upper loops and said lower loops in a crosswise manner and also partially extending over said front part and each having one end arrested on said wall portion of said front part and another end located above said one end; and a tensioning device arranged at a front side and at a center of said wall portion of said front part and connected with said other ends of said belts, said tensioning device being selflocking and having a rotary button formed so that by rotation of said rotary button said belts are pulled forwardly or pushed rearwardly in a stepless manner without use of an additional tool.

2. A horse hoof shoe as defined in claim 1, wherein said tensioning device is provided with two loops each at one side of said wall portion of said front part, each of said other ends of said belts being hooked in a respective one of said loops of said tensioning device.

3. A horse hoof shoe as defined in claim 1, wherein said rear part has two side strip portions including an upper strip and a lower strip engaging said wall portion of said front part, each of said belts being laterally supported by a respective one of said strips.

4. A horse hoof shoe as defined in claim 3, wherein said wall portion of said front part has two loops each located at a respective side of said front part, said lower strip having two strip sections each located at a respective side of said front part and displaceably extending through a respective one of said loops.

5. A horse hoof shoe as defined in claim 4, wherein said each of said lower strip sections has an end and is provided at said end with an abutment.

6. A horse hoof shoe as defined in claim 3, wherein said upper strip portion has two upper strip sections each located at a respective side of said wall portion of said front part and provided with a loop for receiving a respective one of said belts.

7. A horse hoof shoe as defined in claim 1, and further comprising means for fixing said one end of each of said belts on said wall portion of said front part and including screw means.

8. A horse hoof shoe as defined in claim 7, and further comprising two pluralities of holes each provided at a respective side of said wall portion of said front part, and at least two screws each engageable in holes of a respective one of said plurality of holes to adjust said screw means.

9. A horse hoof shoe as defined in claim 1, wherein said bottom portion of said front part has two rear ends; and further comprising means for connecting said rear ends of said bottom portion of said front part with one another and including a connecting strip.

10. A horse hoof shoe as defined in claim 9, wherein each of said rear ends of said bottom portion of said front part has a recess, said connecting means further including a screw member arranged to extend through a respective one of said recesses and attach said strip to a respective one of said ends of said bottom portion of said front part.

* * * * *